Jan. 29, 1924. 1,482,191
W. HORNAUER
ELECTRIC WINDING DEVICE FOR SPRING MOTORS
Filed Dec. 4, 1922

Inventor:
Willy Hornauer

Patented Jan. 29, 1924.

1,482,191

UNITED STATES PATENT OFFICE.

WILLY HORNAUER, OF NEUKOLLN, GERMANY, ASSIGNOR TO VOX MASCHINEN-AKTIENGESELLSCHAFT, OF BERLIN, GERMANY.

ELECTRIC WINDING DEVICE FOR SPRING MOTORS.

Application filed December 4, 1922. Serial No. 604,849.

*To all whom it may concern:*

Be it known that I, WILLY HORNAUER, a citizen of the German Republic, residing at Neukolln, Germany, have invented certain Improvements in Electric Winding Devices for Spring Motors, of which the following is a specification.

Spring motors are sometimes provided with a winding device in the form of a separate motor which is switched off when the spring is fully wound and restarted after the spring has unwound itself. There is, in this arrangement, a considerable difference in the tension of the spring immediately before and after each winding, and this results in a detrimental variation in the speed of the spindle.

The object of the present invention is to produce a winding device whereby the spring will be rewound at intervals which are short enough to maintain the spring at a practically uniform tension, and the invention consists in connecting one end of the spring to a rotary electric switch and the other end to the armature of a magnet system which is controlled by the switch so as to advance one end of the spring in proportion as the other end is retracted.

Figure 1:
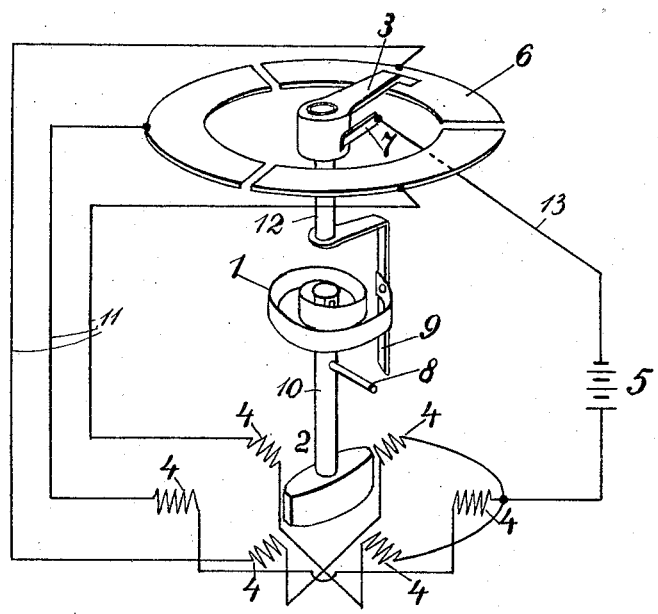
Figure 1:
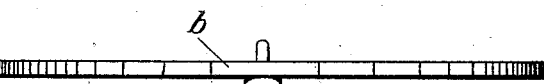
Figure 2:
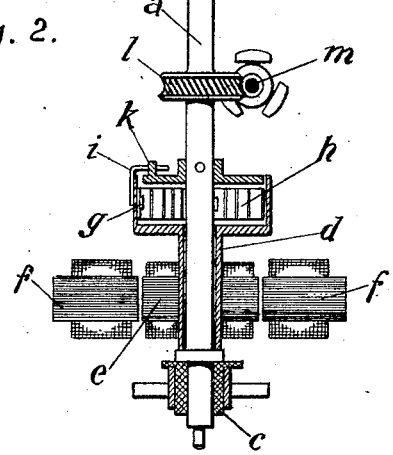

Fig. 1 of the accompanying drawings represents a diagrammatic view of the arrangement, and Fig. 2, a sectional side view of the device as applied to a gramophone spindle.

One end of the driving spring 1 is connected to the shaft 10 of a rotary armature 2 which is actuated by a magnet system 4. The latter consists of a plurality of coils which are spaced uniformly about the armature shaft. In the diagram of Fig. 1 six coils are shown, and diametrically opposite coils are connected in series with an electric source 5. The three pairs of interconnected coils are also connected by wires 11 to three segmental contact plates 6, one to each. These plates are centered about a shaft 12 which is coaxial with the shaft 10 and which carries a switch arm 3, the latter being arranged so as to move from one contact piece to another for collecting the current when the shaft rotates. The second end of the spring 1 is connected by means of a crank 9 to the shaft 12 so as to communicate rotation to the latter. A brush collector 7 connects the arm 3 with the return wire 13 of the electric source 5.

The spring 1 has an initial tension which is sufficient for driving the shaft 12 and which is regulated by means of an arm 8 connected to the shaft 10 so as to form an abutment for the prolonged end of the crank 9. The arm 8 prevents the spring from unwinding beyond the predetermined amount. When the current is switched on, the armature is attracted by a pair of magnets just in advance of it, and the shaft 10 is rotated so as to wind the spring 1 a corresponding fraction of a turn. The motion is communicated by the spring to the shaft 12, and as the arm 3 moves over to the next contact plate, the current is diverted to the next pair of magnets so as to cause another advance of the armature. Thus the shaft 12 will be rotated continuously and uniformly as long as the circuit is closed.

If the device is to be applied to a gramophone, the arrangement illustrated in Fig. 2 may be resorted to.

The spindle $a$ of the turn-table $b$ is geared by means of a worm-wheel $l$ to a governor $m$ which regulates the speed in the usual fashion. Connected to the lower end of the spindle is a commutator $c$ which distributes the current successively to the different pairs of magnet coils $f$, as previously described in connection with the coils 4. The armature $e$ is connected to a sleeve $d$ which is loosely mounted on the spindle $a$ and which carries a spring barrel $g$. One end of the spring $h$ is connected to the barrel $g$ and the other end to the spindle $a$. Thus, while the armature $e$ moves more or less intermittently under the control of the commutator $c$, the spindle will be moved continuously and uniformly by the spring $h$ under the control of the governor $m$.

The spring barrel has an arm $i$ which cooperates with a stud $k$ for preventing the spring from being fully unwound, the stud $k$ being mounted on a disc connected to the spindle $a$.

The arrangement may be modified by adapting the magnet system to rotate, the armature being stationary. Any kind of electric source and any strength of current may be used, and the current may either be continuous or alternating. Three-phase current is suitable. A cylindrical coil spring may be used instead of the flat spiral spring. The arrangement may be such as to allow the strength and pressure of the current to be varied while the apparatus is in use without affecting the uniformity of the spindle speed. Other constructions than those shown and described can be included within the scope of the invention.

I claim:—

1. In a spring motor, the combination with a driving spring, of a rotary electric switch connected to the trail end of said spring so as to be rotated thereby, a magnet system controlled by said switch so as to create a rotating magnetic field, and an armature arranged in the field so as to follow the rotation of the latter, the armature being connected to the leading end of the spring so as to advance it in proportion as the trail end is being retracted.

2. In a spring motor, the combination with a driving spring, of a rotary electric switch connected to the trail end of said spring so as to be rotated thereby, a magnet system controlled by said switch so as to create a rotating magnetic field, an armature arranged in the field so as to follow the rotation of the latter, the armature being connected to the leading end of the spring so as to advance it in proportion as the trail end is being retracted, and a stop adapted to maintain the spring at a certain initial tension.

3. In a spring motor, the combination with a driving spring and with a shaft connected to the trail end of said spring so as to be rotated thereby, of an electric commutator connected to said shaft, a magnet system controlled by said commutator so as to create a rotating magnetic field, an armature arranged in the field so as to follow the rotation of the latter, the armature being connected to the leading end of the spring so as to advance it in proportion as the trail end is being retracted, and a stop for maintaining the spring at a certain initial tension.

4. In a spring motor, the combination with a driving spring and with a shaft connected to the trail end of said spring so as to be rotated thereby, of an electric commutator connected to said shaft, a magnet system controlled by said commutator so as to create a rotating electric field, an armature connected to a shaft which is coaxial with the spring shaft, said armature being arranged in the magnetic field so as to follow the rotation of the latter, the armature being connected to the leading end of the spring so as to advance it in proportion as the trail end is being retracted, and a stop adapted to maintain the spring at a certain initial tension.

5. In a spring motor for gramophones, the combination with a driving spring and with a turn-table spindle connected to the trail end of said spring so as to be rotated thereby, of an electric commutator secured to the lower end of said spring, a magnet system centered about the spindle and controlled by said commutator so as to create a rotating magnetic field, a sleeve arranged loosely on the spindle, an armature connected to said sleeve and held by the same within the magnetic field so that magnet and sleeve will be rotated together with the field, the sleeve being connected to the leading end of the driving spring so as to advance it in proportion as the trail end of the spring is being retracted, and a stop adapted to maintain the spring at a certain initial tension.

WILLY HORNAUER.